United States Patent
Newman et al.

(10) Patent No.: US 12,335,156 B2
(45) Date of Patent: Jun. 17, 2025

(54) RELEASE-TIME BASED PRIORITIZATION OF ON-BOARD CONTENT

(71) Applicant: VIASAT, INC., Carlsbad, CA (US)

(72) Inventors: Daniel Newman, Littleton, MA (US); David McNeil, O'Fallon, MO (US)

(73) Assignee: VIASAT, INC., Carlsbad, CA (US)

(*) Notice: Subject to any disclaimer, the term of this patent is extended or adjusted under 35 U.S.C. 154(b) by 0 days.

(21) Appl. No.: 18/471,023

(22) Filed: Sep. 20, 2023

(65) Prior Publication Data

US 2024/0163218 A1    May 16, 2024

Related U.S. Application Data

(63) Continuation of application No. 17/562,670, filed on Dec. 27, 2021, now Pat. No. 11,811,666, which is a continuation of application No. 17/043,603, filed as application No. PCT/US2018/052029 on Sep. 20, 2018, now Pat. No. 11,240,158.

(60) Provisional application No. 62/659,305, filed on Apr. 18, 2018.

(51) Int. Cl.
*H04L 47/24* (2022.01)
*H04L 47/50* (2022.01)
*H04L 67/5681* (2022.01)

(52) U.S. Cl.
CPC .............. *H04L 47/24* (2013.01); *H04L 47/58* (2013.01); *H04L 67/5681* (2022.05)

(58) Field of Classification Search
CPC ...... H04L 47/24; H04L 47/58; H04L 67/5681
See application file for complete search history.

(56) References Cited

U.S. PATENT DOCUMENTS

| 8,050,696 | B2 | 11/2011 | Buga et al. |
| 8,121,593 | B2 | 2/2012 | Pandit et al. |
| 8,340,067 | B2 | 12/2012 | Buga et al. |

(Continued)

FOREIGN PATENT DOCUMENTS

GB            2551174 A      12/2017

OTHER PUBLICATIONS

Agarwal, S. "Intelligent content caching for mobile devices." In Proceedings of the 13th international conference on telecommunications, p. 4. 2006.

(Continued)

*Primary Examiner* — Yaotang Wang
(74) *Attorney, Agent, or Firm* — HOLZER PATEL DRENNAN

(57) ABSTRACT

Approaches are described for release-time-driven (RTD) prioritization of on-board content scheduling and delivery to in-transit transport craft via communications systems. In context of a constrained network, content is scheduled to be delivered to those in-transit on-board media servers in a manner driven by respective release times and other prioritization factors associated with the updated content. Each content is associated with a RTD priority profile that can define a release time, a release priority, and a profile plot for the content. The RTD priority profiles can be used to compute priority surfaces that define priority scores over a multidimensional space for a particular time. A subset of the content can be selected for delivery based on the priority surfaces, and can be scheduled for delivery according to network capacity determinations.

22 Claims, 6 Drawing Sheets

(56) References Cited

U.S. PATENT DOCUMENTS

| | | |
|---|---|---|
| 8,401,021 B2 | 3/2013 | Buga et al. |
| 9,794,815 B2 | 10/2017 | Lauer |
| 9,946,427 B1 | 4/2018 | Murphy et al. |
| 2009/0070841 A1 | 3/2009 | Buga et al. |
| 2011/0067032 A1* | 3/2011 | Daly ..................... G06F 9/4881 |
| | | 718/103 |
| 2014/0317237 A1 | 10/2014 | Barkai et al. |
| 2016/0162601 A1 | 6/2016 | Wohlert et al. |
| 2016/0191405 A1 | 6/2016 | Dankberg et al. |
| 2016/0214281 A1 | 7/2016 | Chen et al. |
| 2016/0234281 A1 | 8/2016 | Padmanabhan et al. |
| 2018/0102964 A1 | 4/2018 | Kao et al. |
| 2019/0068786 A1* | 2/2019 | Bhatia ................... H04M 15/00 |
| 2019/0164017 A1 | 5/2019 | Chen et al. |
| 2019/0378079 A1 | 12/2019 | Soni et al. |

OTHER PUBLICATIONS

Csc, "GateSync Extending Airline Enterprise Boundaries" Computer Sciences Corporation, 2010, 8 pages.

'Will Thales' GateSync for airlines become the data-loading equivalent of iTunes? <http://blog.apex.aero/ife/interiors-hina-hotbed-activity-local-foreign-ife-suppliers/> Mar. 22, 2012, 3 pages.

* cited by examiner

RELEASE-TIME BASED PRIORITIZATION OF ON-BOARD CONTENT

CROSS REFERENCE TO RELATED CASES

The present application is a continuation of U.S. application Ser. No. 17/562,670, filed on Dec. 27, 2021, which is a continuation of U.S. application Ser. No. 17/043,603, filed on Sep. 29, 2020, which is a U.S. National Stage of PCT/US2018/052029 filed on Sep. 20, 2018, which claims priority benefit of U.S. provisional patent application Ser. No. 62/659,305, filed on Apr. 18, 2018, and entitled "RELEASE-TIME BASED PRIORITIZATION OF ON-BOARD CONTENT," the disclosure of which is incorporated herein in its entirety for all purposes.

FIELD

Embodiments relate generally to communications systems, and, more particularly, to providing release-time based prioritization of on-board content scheduling and delivery to in-transit transport craft via communications systems.

BACKGROUND

It is becoming more common for users to desire to consume streaming media while in transit on a transport craft. For example, passengers consume media on mobile phones, laptop computers, tablet computers, integrated media terminals, and/or other in-transport terminals while travelling by car, airplane, bus, train, cruise ship, or other transport craft. In many cases, some or all of the media is provided to the passengers from an in-transit media server, which includes local storage of various media options for consumption. Providing a desirable in-transit experience to passengers can involve frequently updating the stored content.

Conventional approaches generally involve exploiting the times when the transport craft are docked to update the content stored by the in-transit servers disposed in those craft. For example, in-flight entertainment servers on airplanes are typically updated while the aircraft is parked at an airport terminal, parked in an airport hangar, or otherwise on the ground. In some cases, ground crew personnel board the parked aircraft with a portable server that is loaded with updated content, and manually couple the portable server with the in-flight entertainment server on-board the aircraft. In other cases, the parked aircraft can couple with a local airport network that delivers updated content wirelessly by WiFi, or otherwise.

BRIEF SUMMARY

Among other things, systems and methods are described for providing release-time based prioritization of on-board content scheduling and delivery to in-transit transport craft via communications systems. Embodiments seek to update media stored by on-board media servers disposed on transport craft as those transport craft move through a communications infrastructure (e.g., a multi-carrier communications system). In context of a constrained network, updated content is scheduled to be delivered to those in-transit on-board media servers in a manner driven by respective release times and other prioritization factors associated with the updated content. Each content is associated with a release-time-driven (RTD) priority profile that can define a release time, a release priority, and a profile plot for the content. The RTD priority profiles can be used to compute priority surfaces that define priority scores over a multidimensional space for a particular time. A subset of the content can be selected for delivery based on the priority surfaces, and can be scheduled for delivery according to network capacity determinations.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
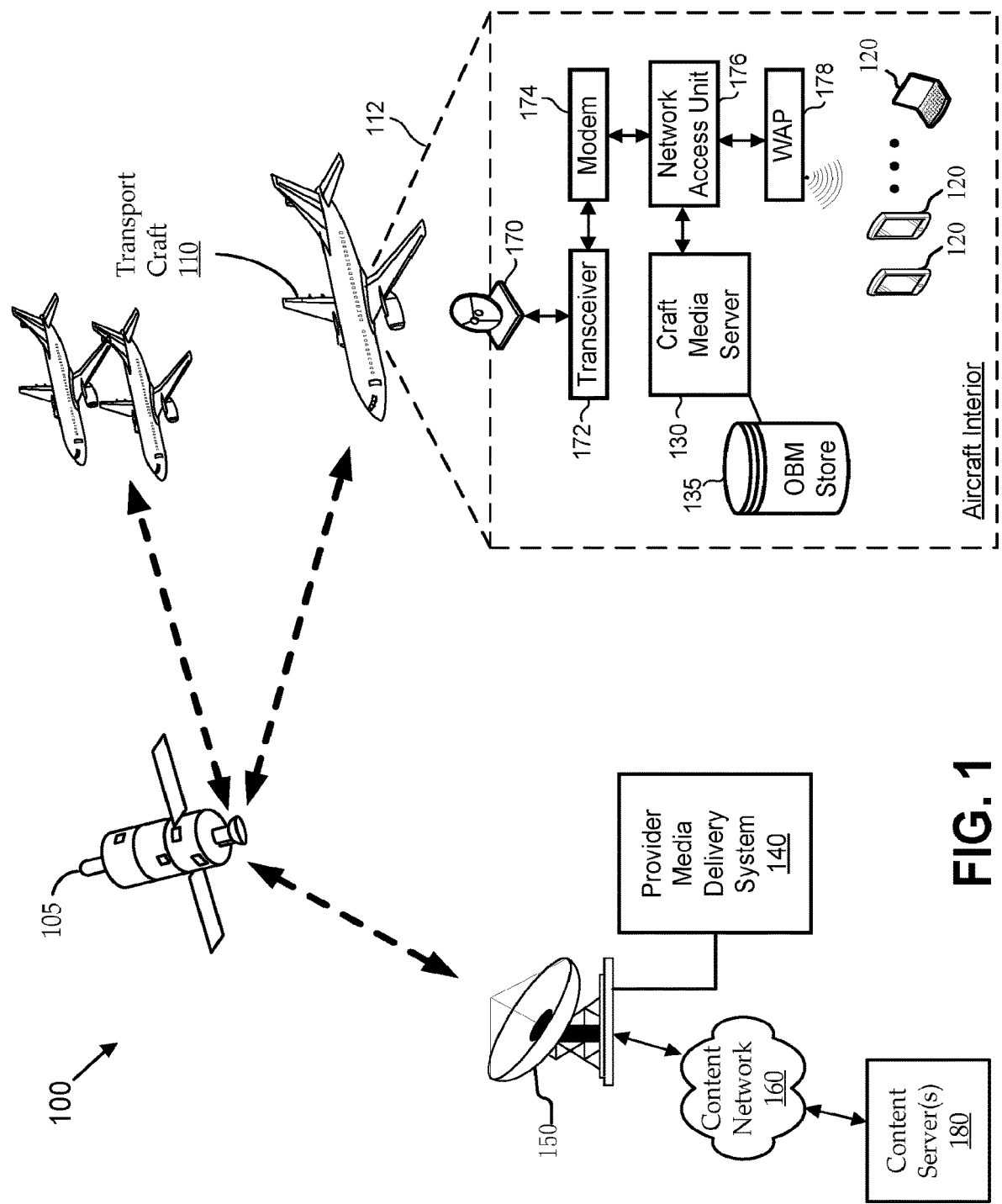
FIG. 1 shows a simplified diagram of a satellite communications system, which provides a context for various embodiments.

FIG. 1 shows a simplified diagram of a satellite communications system 100, which provides a context for various embodiments. The satellite communications system 100 generally facilitates delivery of on-board content from one or more content sources to multiple transport craft 110 according to release-time based prioritization, as described herein. For example, a passenger aircraft can have an on-board system to provide on-board content (e.g., in-flight entertainment) to passengers via in-seat, personal mobile, or other devices. While the passenger aircraft is in flight, its on-board system can be in communication with one or more carriers of the satellite communications system 100, by which it can receive on-board content updates scheduled and delivered to the aircraft based on release-time commitments and/or other factors.

The illustrated embodiment shows a transport craft 110 in communication with one or more content servers 180 via a satellite 105, one or more provider-side nodes (e.g., a gateway 150, one or more core nodes, etc.), and a content network 160. While the satellite communications system 100 is illustrated with the transport craft 110 as a single aircraft in communication with a satellite 105 via a spot beam, such illustration is not intended to be limiting, and embodiments can operate in many different contexts. For example, the satellite communications system 100 can include one or more transport craft(s) 110 (e.g., airplanes, trains, buses, blimps, cruise ships, etc.) communicating via any one or more suitable communications architecture(s), including any suitable communications links Though illustrated as including a satellite 105 and related components, the satellite communications system 100 can alternatively be implemented as, or can include, any suitable communications systems, such as air-to-ground communication systems, hybrid satellite and air-to-ground communications systems, cellular communications systems, etc.

Typically, because of the mobile nature of the transport craft 110, the satellite communications system 100 will likely involve at least one wireless communications link. In some embodiments, the transport craft(s) 110 can be in communication with a satellite communications system 100 having multiple carriers. The term "carrier" is used generally to include a wireless communications link by which one or more transport craft 110 and/or client devices 120 can be serviced, such as a spot beam of a satellite communications system 100 (e.g., servicing a particular spot beam coverage area), a particular carrier frequency band and/or polarization within a spot beam of a satellite communications system 100 (e.g., servicing some or all terminals in a particular spot beam coverage area), a cellular carrier frequency band (e.g., servicing cellular terminals in a particular cell coverage area), etc. For example, a communication with a particular carrier can involve communicating over a respective wireless link using a particular frequency, polarization, etc. The communications system architecture can use multiple carriers to provide various features, including servicing a large service area made up of multiple carrier coverage areas (e.g., spot beam coverage areas, cell coverage areas, etc.). Carrier coverage areas can partially or fully overlap, so that certain geographic regions are serviced (e.g., concurrently) by multiple carriers. As the transport craft 110 moves through the satellite communications system 100, it can move through multiple carrier coverage areas, so that communications services can be provided to the transport craft 110 via different carriers over time. For example, during a transatlantic or international airplane flight, an airplane, and the client devices 120 of passengers on the airplane, may move through a number of carrier coverage areas; and the different carriers servicing those coverage areas can be used over time to maintain communications with the transport craft 110 over a large geographic region covered during transport (e.g., the traversed region is larger than a single carrier coverage area), and/or to provide other features, such as facilitating load balancing across multiple carriers, grouping of terminals by carrier, etc. Moving a transport craft 110 from one carrier to another carrier during transport can involve "handover" of communications services between those carriers, which can involve handing over pending multicast communications and/or other services in some cases.

Media can be obtained from the content server(s) 180 via the content network 160 and gateway 150 (and/or other ground terminals or other network nodes). The media can be obtained as content file sets. The term "content file set" generally refers to any set of one or more related files to be treated together with respect to communication to one or more transport craft 110. In some implementations, a particular media object (e.g., a movie, television episode, etc.) is stored as a content file set having multiple files. In one such implementation, each of the multiple files stores a respective temporal portion of the media object (e.g., a range of blocks of media data, etc.). In another such implementation, the particular media object is stored according to an adaptive encoding scheme, such as according to the H.264 advanced video coding (AVC) format, and each of the multiple files stores a respective portion of the encoding data (e.g., one file stores a base encoding layer, and other files store enhancement layers, or the like). In some implementations, multiple media objects are grouped together for communication to one or more transport craft 110 (e.g., a group of television episodes, a group of new-release movies, a group of software updates, etc.), and each of multiple files of the content file set stores data for a respective one of the grouped media objects. As described herein, some content file sets store media objects being treated in accordance with release-time based delivery prioritization (referred to herein as "release-time prioritized media objects," or "RTP media objects"). Other content file sets can store other types of media objects, such as those being communicated to one or more transport craft 110 in response to passenger requests for media, in response to normal web browsing by passengers, as part of pushing media content to the transport craft 110 without release-time based delivery prioritization, etc.

The content network 160 can include any suitable type of network, such as the Internet, an IP network, an intranet, a wide area network (WAN), local area network (LAN), a virtual private network (VPN), a virtual LAN (VLAN), a fiber optic network, a cable network, a public switched telephone network (PSTN), a public switched data network (PSDN), a public land mobile network, and/or any other type of network supporting communication as described herein. The network 160 can include both wired and wireless connections as well as optical links.

The content server(s) 180 can be accessible via the satellite 105 in any suitable architecture. For example, content file sets (e.g., storing audio and/or video media) can be generated by the content server(s) 180, stored at the content server(s) 180, and/or received by the content server(s) 180 via network 160; and the content server(s) 180 may be located at the gateway 150, core node, or any other suitable location of the communications infrastructure. Some content file sets, such as those representing RTP media objects, can be communicated from the content server(s) 180 to one or more transport crat 110 for storage by one or more craft media servers 130 while in flight, via the satellite 105 and the on-board communication system 112. Other content file sets, such as those not representing RTP media objects, can be communicated from the content server(s) 180 to the client devices 120 (e.g., in response to requests for such media from the client devices 120), while in flight, via the satellite 105 and the on-board communication system 112. Although only one content server 180 is shown to avoid over complication of the drawing, the content file sets received by the transport craft 110 may be from one or more content server(s) 180 in one or more locations. The content file sets can be communicated to the transport craft 110 using any suitable communications protocols and/or schema, such as by unicast or multicast (e.g., or any other suitable point-to-point or point-to-multipoint communications). Multicast communications can be implemented in any suitable manner. In one implementation, traffic (e.g., including content file sets) can be assigned to a multicast service flow to be communicated to multiple destination transport craft 110 according to a multicast protocol. The multicast service flow can be associated with a multicast group identifier, and the multiple destination transport craft 110 can subscribe to the multicast service flow using the multicast group identifier. This can cause components of those subscribed transport craft 110 to accept traffic received over the multicast service flow (e.g., while ignoring traffic received over any multicast service flows to which the transport craft 110 has not subscribed).

The transport craft 110 can include an on-board communication system 112 to facilitate communication with the satellite 105. In the illustrated embodiment, the on-board communication system 112 includes an antenna system 170, transceiver 172, modem 174, network access unit 176, wireless access point (WAP) 176, and craft media server 130. Though shown as a particular arrangement of components, some or all of the components of the on-board communications system 112 can be integrated into a single component or separated into additional components. For example, the modem 174 can be integrated with the network access unit 176, or can be a separate component. In some implementations, the on-board communication system 112 can provide for reception of a forward downlink signal from the satellite 105 and transmission of a return uplink signal to the satellite 105 to support two-way data communications between client devices 120 within the transport craft 110 and the content server(s) 180. The client devices 120 can include mobile devices (e.g., smartphones, laptops, tablets, netbooks, and the like) such as personal electronic devices (PEDs) brought onto the transport craft 110 by passengers. As further examples, the client devices 120 can include passenger seat back systems, or other devices on the transport craft 110. The client devices 120 can communicate with the network access unit 176 via a communication link that can be wired and/or wireless. The communication link can be, for example, part of a local area network such as a wireless local area network (WLAN) support by WAP 178. One or more WAPs 178 can be distributed about the transport craft 110, and can, in conjunction with network access unit 176, provide traffic switching and routing functionality; for example, as part of a WLAN extended service set (ESS), etc.

The network access unit 176 can treat different types of traffic in different ways. When traffic is received by the on-board communication system 112 of a transport craft 110, embodiments of the network access unit 176 can route some or all content file sets to the craft media server 130 for storage (e.g., in an on-board media store 135), and can route other network traffic directly to client devices 120. For example, content file sets representing RTP media objects and/or other media objects being pushed to the transport craft 110 (e.g., being pre-positioned to the craft media server 130, but not according to release-time driven prioritization) can be routed by the network access unit 176 for storage by the craft media server 130; while traffic representing passenger-requested media objects and/or other network traffic relating to normal web browsing, or the like, can be routed to requesting client devices 120. Such traffic can be received by the transceiver 172 as a forward downlink signal from the satellite 105 via the antenna system 170. The transceiver 172 can amplify and downconvert the forward downlink signal to generate modulated downlink data (e.g., a receive IF signal) for demodulation by the modem 174. The demodulated downlink data from the modem 174 can be provided to the network access unit 176 for appropriate routing to the craft media server 130 or the client devices 120.

Embodiments of the network access unit 176 can operate in a similar fashion when handling requests from client devices 120. When requests for data (e.g., media or other data) are received by the network access unit 176 from client devices 120, the network access unit 176 can route the requests in accordance with the type of data being requested. For example, if a client device 120 request is for an RTP media object for which a corresponding content file set has been stored by the craft media server 130, the network access unit 176 can route the request to the craft media server 130, and the craft media server 130 can fulfill the request. If the network access unit 176 receives a client device 120 request for other network traffic such as normal web browsing data (e.g., web page data, etc.), linear programming, or the like, the network access unit 176 can route the request to an appropriate destination off the transport craft 110 that is accessible via the content network 160. For example, the network access unit 176 can provide uplink data received from the client devices 120 to the modem 174 to generate modulated uplink data (e.g., a transmit intermediate frequency (IF) signal) for delivery to the transceiver 172. The transceiver 172 can upconvert and then amplify the modulated uplink data to generate the return uplink signal for transmission to the satellite 105 via the antenna system 170.

Embodiments of the craft media server 130 store the media objects as on-board media content (e.g., including media objects received as content file sets) in an on-board media store 135. Embodiments of the on-board media store 135 can include non-transient storage, such as one or more hard-disk drives, solid-state drives, and/or the like. On-board media content stored in the on-board media store 135 can be provided to client devices 120 via the craft media server 130 in response to requests from the client devices 120. The functions of the craft media server 130 can be implemented in hardware, instructions embodied in memory and formatted to be executed by one or more general or application-specific processors, firmware, or any combination thereof. While the craft media server 130 and the on-board media store 135 are shown as separate devices, some implementations of the craft media server 130 incorporate the on-board media store 135. Some implementations of the craft media server 130 incorporate other components of the on-board communication system 112, such as the network access unit 176 and/or WAP 178.

Providers of the on-board media content may desire to continually, or periodically, update the on-board media content stored by the on-board media store 135. Conventional approaches to updating the on-board media store 135 typically involve loading updates while the transport craft 110 is not in transit. For example, while an airplane is parked at an airport terminal or in a hangar, ground services personnel can bring a portable storage device on board the airplane and can either physically replace physical storage of the on-board media store 135 with the portable storage device, or can couple the portable device to the on-board media store 135 for manually loading updated content to the on-board media store 135. Alternatively, while the airplane is parked at a gate or hanger, updated content can be downloaded from a ground network local to the airport.

Embodiments described herein include a provider media delivery system 140 that uses release-time based prioritization to enable delivery of on-board media content to transport craft 110 via the communications system 100 for storage in on-board media stores 135 while the transport craft 110 are in transport. Conventionally, certain constraints have tended to frustrate in-transit delivery of on-board media content. One such constraint is that each transport craft 110 is only in transport, and in communication with carriers of the communications system 100, at certain times and for certain amounts of time. Another such constraint is that the carriers of the communications system 100 have limited amounts of available bandwidth and/or other resources at any particular time, and those amounts can change over time. Another such constraint is that the relative delivery priority of various content objects of the on-board media content can be based on a number of factors, such as time, aircraft, content types, etc. Release-time based prioritization techniques described herein can overcome these constraints.

Figure 2:
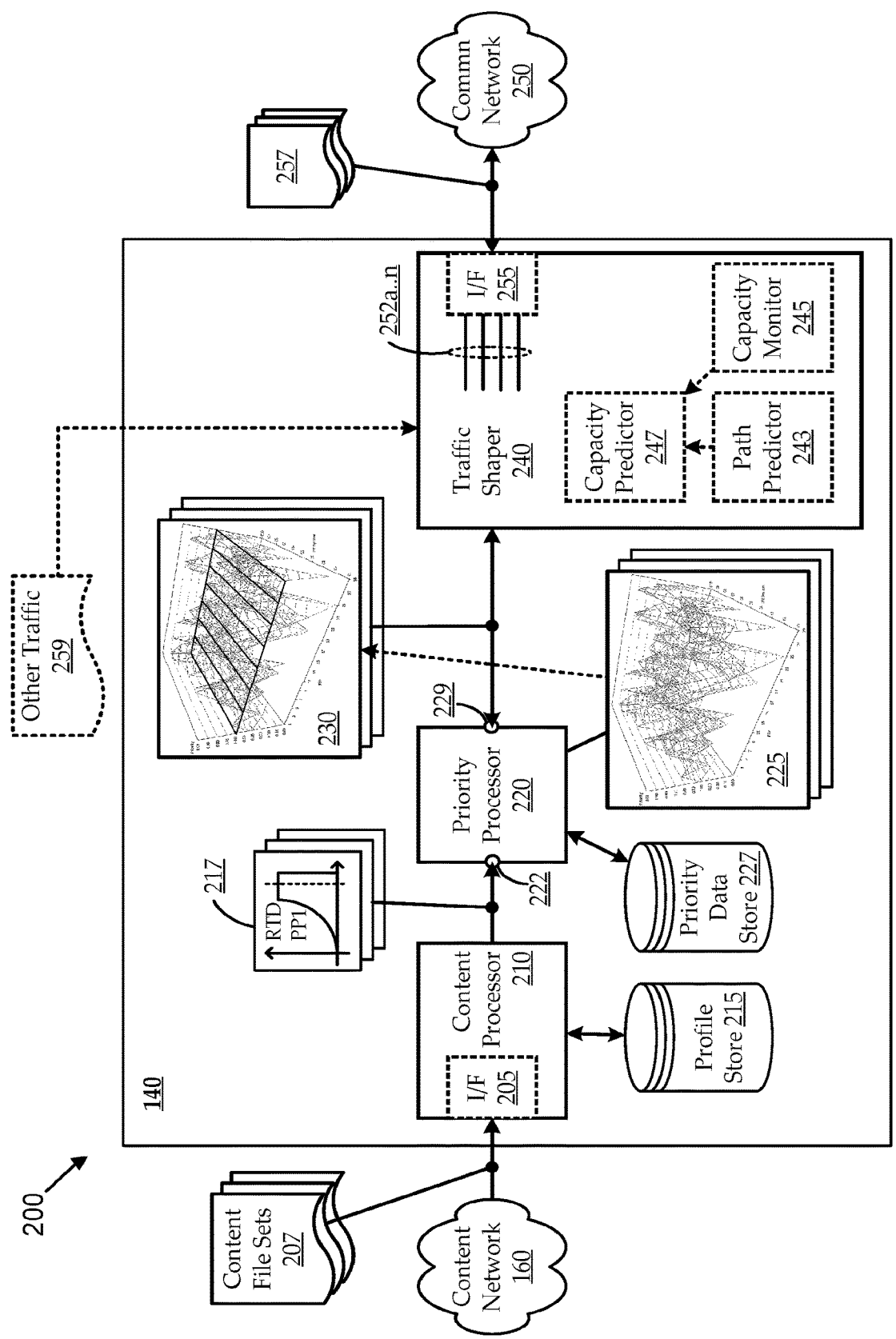
FIG. 2 shows a portion of a release-time driven media delivery environment including an illustrative provider media delivery system, according to various embodiments.

FIG. 2 shows a portion of a release-time driven media delivery environment 200 including an illustrative provider media delivery system 140, according to various embodiments. The provider media delivery system 140 is illustrated in context of the content network 160 of FIG. 1 and a communications network 250. The communications network 250 can include some or all of the satellite communications system depicted in FIG. 1, or any other suitable network or networks. For example, in a satellite network context, the provider media delivery system 140 can be implemented in any suitable one or more provider-side nodes, such as in a gateway terminal. Though a specific configuration of the provider media delivery system 140 is shown, many other configurations are possible having more or fewer components. Moreover, the functionalities described herein can be distributed among the components in a different manner than described herein.

As illustrated, the provider media delivery system 140 includes a content processor 210, a priority processor 220, and a traffic shaper 240. Embodiments of these components of the provider media delivery system 140 can be implemented in any suitable manner, such as by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Hardware can include one or more Application Specific Integrated Circuits ("ASICs") adapted to perform a subset of the applicable functions in hardware, one or more other processing units (or cores) on one or more integrated circuits, one or more other types of integrated circuits (e.g., Structured/Platform ASICs, Field Programmable Gate Arrays ("FPGAs") and other Semi-Custom ICs), and/or one or more other general or application specific processors. One or more types and configurations of memory may be integrated into the hardware, or may be one or more separate components.

In some embodiments, provider media delivery system 140 includes a content network interface 205 configured to provide communication between components of the provider media delivery system 140 and the content network 160. Embodiments of the content network interface 205 can additionally, or alternatively, provide an interface between the provider media delivery system 140 and on-demand programming servers, linear programming servers, and/or other local and/or remote content servers not coupled via the content network 160. The content network interface 205 can be configured to receive media content intended to be stored in an on-board media store 135 of one or more transport craft as on-board media content.

Embodiments of the provider media delivery system 140 also include a communications network interface 255 configured to provide communication between the provider media delivery system 140 and the transport craft 110 via components of a satellite or other communications network 250. For example, as described with reference to FIG. 1, such communications can be via one or more ground terminals (e.g., gateway terminal 150), feeder communication links, satellites 105, service communication links, etc. For example, as described more fully below, the communications network interface 255 can forward packets of data from the traffic shaper 240 as a forward packet stream for delivery to the transport craft 110 (e.g., including data for content file sets 207 representing RTP media objects, and data for any other network traffic 259 destined for the transport craft 110). In some implementations, the communications network interface 255 supports two-way communications with the communications network 250. For example, the communications network interface 255 can facilitate both transmission of forward-link packets (e.g., transmission of the forward-link traffic streams 257) to the communications network 250 and reception of return-link packets from the communications network 250 (e.g., for processing by the provider media delivery system 140 and/or for forwarding to the content network 160, the Internet, one or more servers, etc.).

Embodiments of the content processor 210 can include the content network interface 205, by which it can access content file sets 207 stored by the content network 160 (e.g., by one or more servers of, or in communication with, the content network 160). The content processor 210 can also include a profile store 215 having, stored thereon, release-time-driven (RTD) priority profiles 217. Each RTD priority profile 217 is associated with a respective one of the content file sets 207, and each content file set 207 is associated with (e.g., stored in relation to) an assigned release time and an assigned release priority score. In some embodiments, all content file sets 207 are associated with a same assigned release priority score (but different RTD priority profiles 217 and/or different assigned release times). In other embodiments, different content file sets 207 can be associated with different assigned release priority scores. As one example, different RTP media objects can be associated with different contractual obligations for delivery (e.g., some requiring delivery by the assigned release time, and others preferring delivery by the assigned release time; some subject to contractual obligations with one party, and others subject to contractual obligations with another party; etc.), and the content file sets corresponding to those different RTP media objects can be associated with correspondingly different assigned release priority scores. As another example, a first set of media objects is treated as RTP media objects because of a related contractual obligation, while a second set of media objects is treated as RTP media objects because of a non-contractual determination that those media objects are likely to be desired and/or requested by passengers; and the content file sets corresponding to the first set of media objects may be associated with higher assigned release priority scores, accordingly. As another example, different RTP media objects can have different characteristics that can impact the amount of resources needed to communicate those objects (e.g., different file sizes due to different runtimes, different resolutions, etc.), and the content file sets corresponding to those different RTP media objects can be associated with correspondingly different assigned release priority scores.

Each RTD priority profile 217 defines priority scores over a range of times for delivery of the respective content file set 207 via the communications system 250. The range of times can include a first time window during which the respective priority scores are less than the assigned release priority score of the respective content file set, and a second time window succeeding the first time window and including the assigned release time of the respective content file set, where the respective priority scores equaling the assigned release priority score during at least a portion of the second time window.

For example, FIGS. 3A-3E show profile plots 300 of illustrative RTD priority profiles 217. Each of the profile plots 300 shows a function of priority over time for an illustrative type of respective content file set 207. In general, each profile plot 300 reaches some assigned release priority score 315 by some defined release time 310. Further, each profile plot 300 indicates multiple time windows 320, where the assigned release priority score 315 is reached at least by the defined release time 310 at some point during a defined second time window 320b. The various profile plots of FIGS. 3A-3E are not intended to indicate scale and are intended only to illustrate some of many possible profile plots 300 for different RTD priority profiles 217. For example, other profile plots 300 can include any suitable number of time windows 320 of any suitable durations, any types of curvature (e.g., linear, exponential, step, discontinuous, periodic, etc.), etc.

The priorities plotted on each profile plot 300 represents a priority level (e.g., expressed as a priority score, or in any other suitable manner) for delivery of a particular content file set 207 (corresponding to a RTP media object) relative to priorities for delivering other traffic. The priorities may only account for traffic being communicated with the transport craft 110, or the priorities may account for all traffic being communicated over some or all of a network (e.g., over a carrier, over all carriers, etc.). At any particular time, various types of traffic are competing for limited network resources, such as bandwidth. The various types of traffic can include traffic relating to RTP media objects being delivered to transport craft 110; traffic relating to passenger web browsing, email communications, messaging, or the like; traffic relating to passenger-requested media objects; traffic relating to media objects and other content being pre-positioned, but not according to release-time based prioritization; etc. For example, at a particular time, a large amount of traffic, including different types of data, is scheduled for delivery to transport craft 110, and the traffic can be prioritized according to various schemes, including the novel release date based prioritization described herein.

Figure 3A:
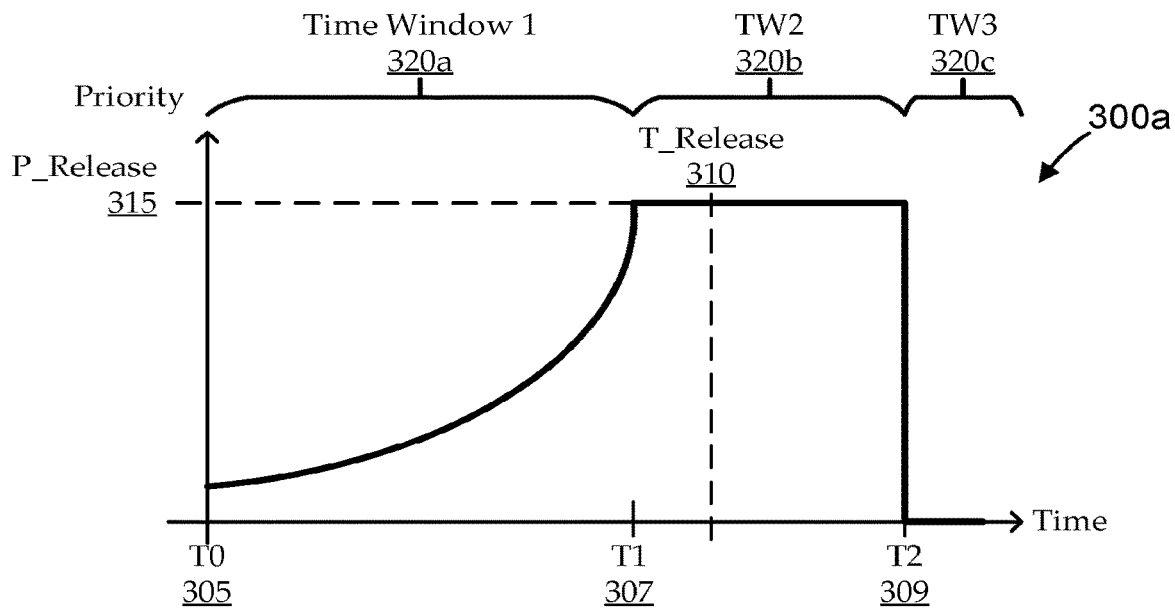
FIGS. 3A-3E show profile plots of illustrative RTD priority profiles.

Turning first to FIG. 3A, a first profile plot 300a shows three time windows 320: a first time window 320a spanning between TO 305 and T1 307 (TO corresponding to some initial time); a second time window 320b spanning between T1 307 and T2 309; and a third time window 320c beginning at T2 309 and having either no defined end, an arbitrarily defined end at some future time, a defined ending time (not shown), or any other suitable ending time. During the first time window 320a, the priority for the content file set 207 increases exponentially from some starting level below the assigned release priority score 315, and the priority reaches the assigned release priority score 315 by T1 307. The priority level is at the assigned release priority score 315 during the entire second time window 320b between T1 307 and T2 309. At the start of the third time window 320c, the priority for the content file set 207 drops to zero.

An example scenario for such a RTD priority profile 217 is when a transport craft 110 operator has an agreement with a content provider to release a new movie or television series episode by an agreed upon release date for on-board consumption. The release time 310 can be defined as the agreed upon release date at which the content file set is stored on-board at the craft media server 130 and available for requests from the client devices 120. Alternatively, the release time 310 can be defined according to some predetermined (e.g., and agreed-upon) function relating to the release date (e.g., within 48 hours of the agreed upon release date). In some cases, multiple release times 310 can be agreed upon and defined as part of the RTD priority profile 217, such as a target release time and a final release time (e.g., after which certain penalties take effect, etc.). As described further herein, the RTD priority profile 217 can drive the scheduling and delivery of content file sets 207 to the transport craft 110. For example, at the beginning of the first time window 320a, most or all other uses of communications network 250 resources (e.g., other network traffic 259) are likely to take precedence over the low-priority communication of the content file set 207 associated with the profile plot 300a. However, by the end of the first time window 320a, and throughout the second time window 320b, communication of the content file set 207 associated with the RTD priority profile 217 may take precedence over most or all other uses of communications network 250 resources. As indicated by time window 320c, some content delivery (e.g., some agreements) may be of a type where, if the content file set 207 still has not been delivered by some time (e.g., by T2 309 in the illustrated case), there is no longer any priority to do so (e.g., the agreement is void at that point, the content file set 207 is stale at that point, etc.).

Figure 3B:
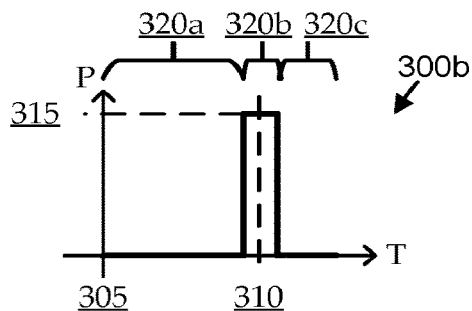

Turning to FIG. 3B, another profile plot 300b is shown having three time windows 320. In the illustrated scenario, there is substantially no priority associated with delivering the associated content file set 207 during the entire first time window 320a and third time window 320c. The priority level jumps to the assigned release priority score 315 for the duration of the second time window 320b, which begins shortly before the release time 310 and ends shortly after the release time 310. An example of such a scenario is for media relating to a particular event, or the like, where the associated content file set 207 may not be available until shortly before the release time 310, and may not be of great interest for very long thereafter; or where the transport craft 110 provider is only granted a license to provide the content for a small defined window (i.e., the second time window 320b).

Figure 3C:
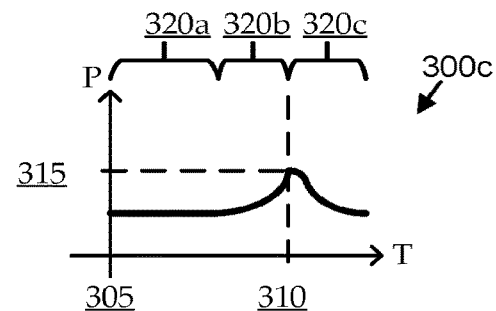

FIG. 3C shows another profile plot 300c having three time windows 320. In the illustrated scenario, the delivery priority sits at a level around one-third to one-half of the assigned release priority score 315 for the entire first time window 320a. During the second time window 320b, the priority level rises until it reaches the assigned release priority score 315 at the end of the second time window 320b. After reaching the assigned release priority score 315, the priority level begins to drop off according to a particular function over the third time window 320c. An example of such a scenario is for a media campaign offered by the transport craft 110 provider (e.g., filler video content to play when the in-transport entertainment system is unavailable, updates to a live map display application, etc.), where the provider has a relatively consistent, medium-level priority to get the content file set 207 delivered to its fleet of transport craft 110 by around some target release date; but the priority level for that content file set 207 generally remains below the respective release priorities 315 of other types of media.

Figure 3D:
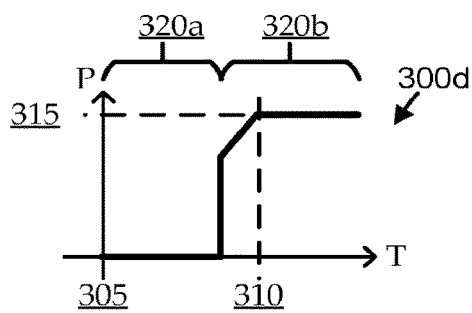

FIG. 3D shows another profile plot 300d having only a first time window 320a and a second time window 320b. In the illustrated scenario, the delivery priority is substantially at zero throughout the first time window 320a. In the second time window 320b, the priority level jumps to some intermediate level below the assigned release priority score 315, then quickly and linearly increases to the assigned release priority score 315, where the priority level remains throughout the second time window 320*b* (e.g., and indefinitely). An example of such a scenario is for a new television series, advertisement, software update, or other type of content file set 207, for which the provider has a strong priority to deliver the content file set 207 to its fleet of transport craft 110 and will keep working to do so until the content file set 207 is delivered.

Figure 3E:
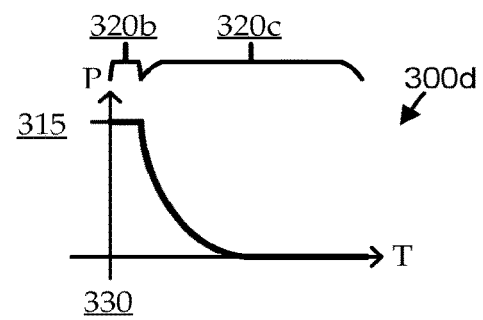

FIG. 3E shows another type of profile plot 300*e* for a content file set 207 not associated with an RTP media object, such as a content file set 207 communicated in response to an in-transit passenger request for a media object not stored at the craft media server 130. The profile plot 300*e* is illustrated as having only a second time window 320*b* and a third time window 320*c*, and the x-axis begins at a request time 330 (rather than at a release time 310, as in FIGS. 3A-3D). Because the content file set 207 corresponds to a passenger-requested media object, embodiments can assign a high immediate prioritize to the delivery of this content in an attempt to fulfill the passenger request; but the priority may drop off shortly thereafter (e.g., if the request is not fulfilled within a short period of time, there may be no need to fulfill the request subsequently). As illustrated, the priority level begins at the assigned release priority score 315, the delivery priority remains at the assigned release priority score 315 throughout the second time window 320*a* (for a relatively short time), and the priority level quickly and exponentially drops to zero in the third time window 320*c*.

In some embodiments, the various scenarios described with reference to FIGS. 3A-3E, or other suitable scenarios, can be combined with other techniques for delivering content to the transport craft 110. As one example, transport provider personnel (e.g., airport ground personnel) can manually update the on-board media stores 135 of transport craft 110 while the transport craft 110 are parked in a gate, hangar, or the like (e.g., by carrying physical media onto the transport craft 110 and manually loading the media onto the on-board media stores 135); and some of those manual updates can include data for RTP media objects. In the event that the manual update occurs while the profile plot 300 for a particular RTP media object (that is part of the update) is still in the in the first time window 320*a* or the second time window 320*b*, and while the content file set 207 for the particular RTP media object has not yet been communicated to the transport craft 110, the profile plot 300 for the particular RTP media object can be revised to reflect a zero priority (i.e., the relevant content file set 207 has already been delivered). As another example, the network access unit 176, or any other suitable component, can detect when RTP media objects are requested by a client device 120, but are not yet available via the craft media server 130. As data (e.g., content file sets 207) is received in response to those requests, the data can be routed for storage by the craft media server 130 as well as delivery to the requesting client device 120. These various embodiments can combine techniques at any suitable time. One case is where a manual update or passenger request includes a particular RTP media object for which the content file set 207 for the particular RTP media object has not yet been communicated to the transport craft 110, and the profile plot 300 corresponding to the particular RTP media object is still in the in the first time window 320*a* or the second time window 320*b* (e.g., or not past the release time 310). In such a case, the particular RTP media object can be made available via the craft media server 130 by the manual update or by fulfilling the passenger request, and the profile plot 300 corresponding to the particular RTP media object can be revised to reflect a zero priority (i.e., the relevant content file set 207 has already been delivered). Another case is where the content file set 207 for the particular RTP media object still has not been communicated to the transport craft 110, even though the release time 310 has past. In such a case, a manual update, fulfillment of a passenger request, or subsequent delivery of the corresponding content file set 207 over the communications network by a best effort communication protocol, or the like, can be used to make the particular RTP media object available via the craft media server 130.

Figure 6:
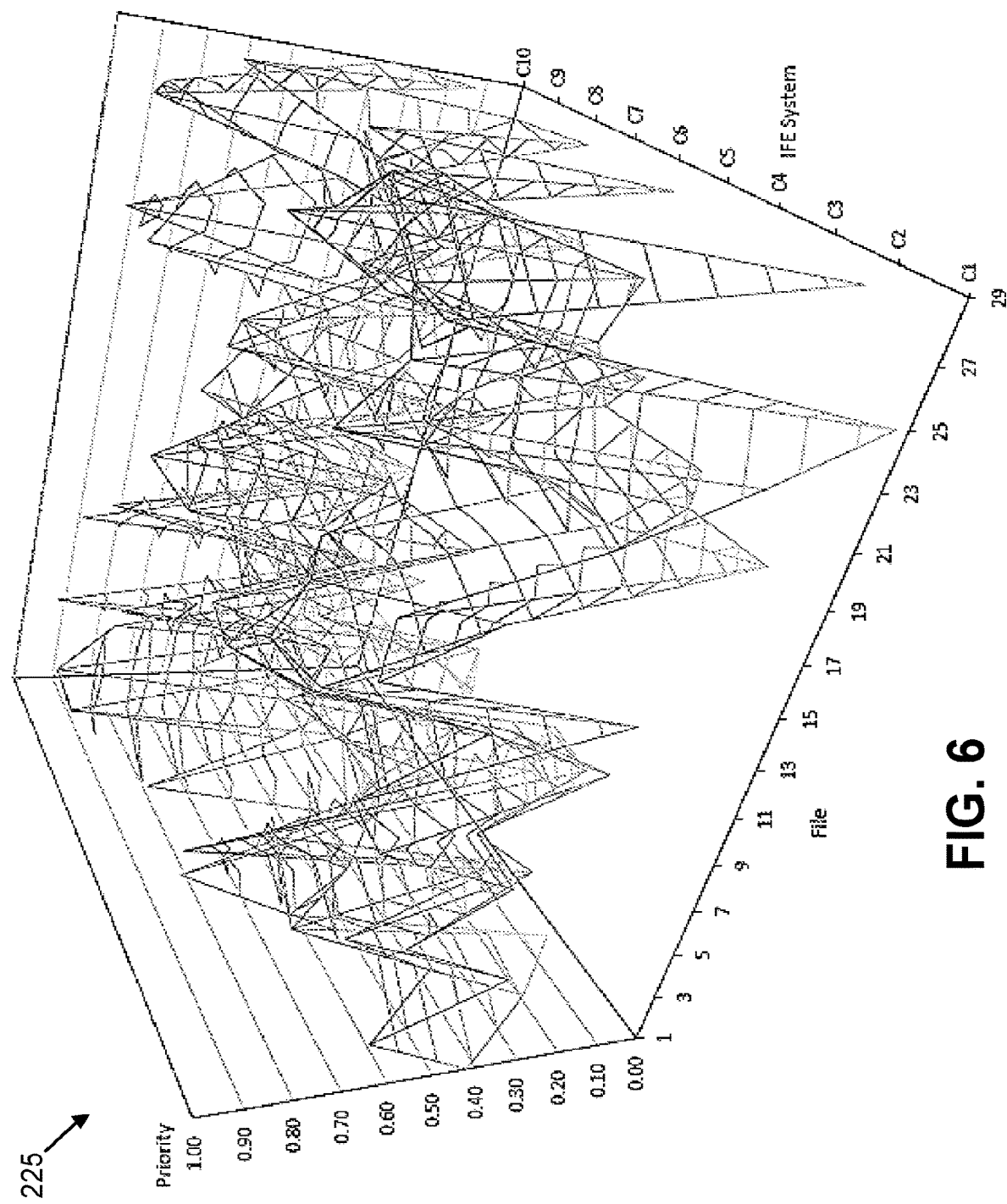
FIG. 6 shows an expanded view of the priority surface illustrated in FIG. 2.

Returning to FIG. 2, the content processor 210 can communicate some or all RTD priority profiles 217 to the priority processor 220 via a profile interface 222. The priority processor 220 can compute a priority surface 225 as a function of the RTD priority profiles 217 for a selected time of the range of times. As one example, the selected time is a current time. As another example, the selected time is a future time that is ahead of the current time. The future time may for example be shortly ahead of a current time (e.g., to account for system latencies and/or other delays, such that the selected time is the time at which the delivery files are expected to arrive at the transport crafts). As another example, the future time selected time is a future time that is further ahead (e.g., a few minutes ahead). The priority surface 225 defines priority scores for the selected time over multiple dimensions. For the sake of legibility, FIG. 6 shows an expanded view of priority surface 225. Though particular dimensions are shown, other embodiments can include more and/or different dimensions. For example, in the illustrated priority surface 225 each point on one axis represents a respective one of a set of craft media servers 130 (labeled as in-flight entertainment (IFE) systems C1-C10). In alternative embodiments, multiples of the craft media servers 130 can be grouped (e.g., by which carrier is or will be servicing their respective transport craft 110 at a particular time) or selected by the priority processor 220, and each point on the axis can represent a respective grouping. In some embodiments, the craft media servers 130 can be grouped (or selected) on a per-carrier basis based on the carriers that are currently or predicted to provide service to the respective transport crafts 110 at the particular time. In such a case, each point on one axis represents the group of transport crafts 110 that is or will be served by one of carriers at the particular selected time. In embodiments in which the grouping is based on which carrier is currently servicing the various transport crafts 110, various techniques may be used to perform the grouping. For example, data may be provided to the priority processor 220 by one or more provider-side nodes of the satellite communication system 100 indicating which transport crafts 110 are currently communicating via which carriers. As another example, current locations may be reported from the various transport crafts 110 (e.g., from respective on-board GPS receivers) to determine which transport crafts 110 are within the coverage areas of which carriers. In embodiments in which the grouping is based on which carrier is predicted to be servicing the various transport crafts 110 at a particular time in the future, various techniques may be used to predict the location of the various transport crafts 110 at that particular time. For example, from the current location and forecasted transit paths of each transport craft 110, the priority processor 220 may determine the predicted locations of each transport craft 110 at the particular time. The forecasted transit path of a particular transport craft 110 may be determined based on present route information (e.g., location, altitude, speed, etc.), and/or planned route information (e.g., origin and destination locations, etc.), and/or other path related information (e.g., weather patterns, historical data from similar trips, etc.)

associated with that particular transport craft 110. Such information may be provided from a database maintained by one or more provider-side nodes of the satellite communication system 100. In the illustrated priority surface 225 each point on another axis represents a respective one of a set of content file sets 207 (labeled as files 1-29). In an alternative embodiment, multiples of the content file sets 207 can be grouped for prioritization at a particular time, and each point on the axis can represent a respective grouping.

As shown, embodiments of the priority surface 225 contain priority scores for the selected time over at least at least some of the content file sets 207 over at least some of the craft media servers 130 (e.g., on-board media stores 135). For example, at any given time, different content file sets 207 (e.g., or different files of different content file sets 207, in some cases) have different associated delivery priorities associated with different craft media servers 130 based at least on the underlying RTD priority profile 217 of the content file set 207 and whether that particular content file set 207 has already been delivered to a particular craft media server 130 (e.g., in which case, the priority score for the content file set 207 with respect to the particular craft media server 130 can be set to zero, and the priority score for the content file set 207 with respect to any other craft media servers 130 impacted by that delivery can be adjusted accordingly). In some cases, the priority score for a particular content file set 207 with respect to a particular craft media server 130 and/or the threshold data used to compute an intersection surface (e.g., as described with reference to FIG. 4 below) is a function of additional factors. For example, as described more fully below, such delivery priorities can be impacted by present and/or predicted network capacity of the communications network 250, known and/or predicted transit path information for transport craft 110, capacity and/or other characteristics of on-board media stores 135), and/or other factors.

In some embodiments, the priority processor 220 includes, or is in communication with, a priority data store 227 that has, stored thereon, these and/or other types of data used in computing the priority surfaces 225. In some such embodiments, the priority data store 227 can include data indicating present contents of on-board media stores 135 obtained in any suitable manner. In one implementation, the priority processor 220 can track which content file sets 207 have been successfully delivered to which craft media servers 130 by monitoring acknowledgement and/or negative acknowledgement packets for content file set 207 packets sent to various craft media servers 130. In another implementation, the priority data store 227 can indicate which content file sets 207 have been communicated to which craft media servers 130 (e.g., which may or may not be an accurate reflection of what was successfully received by those craft media servers 130). In another implementation, the priority data store 227 can indicate which craft media servers 130 have received which content file sets 207 in accordance with periodically receiving synchronization (e.g., "phone home") messages from the craft media servers 130 that update the priority data store 227 with the present contents of their on-board media stores 135. The priority surfaces 225 can be computed to account for which content file sets 207 are presently stored on the craft media servers 130. For example, when the priority processor 220 has an indication that a particular content file set 207 is presently stored on a particular craft media server 130, the priority score for the particular content file set 207 with respect to the particular craft media server 130 may be set to zero for all subsequent times, and computation of priority surfaces 225 can be impacted, accordingly. In some embodiments, dependencies can exist between various priority scores, such that a change in one priority score can cause a change in other priority scores. For example, a communications provider may be contractually obligated to deliver at least two new release movies to a set of transport craft 110 by a particular release date. In accordance with this obligation, priority profiles can be assigned to content file sets 207 corresponding to multiple (e.g., five) new release movies. When feedback to the priority processor 220 indicates that two of those new release movies have been delivered to the craft media servers 130 of the transport craft 110, the contractual obligation has been met; and the priority scores for the other (as-yet-undelivered) new release movies can be lowered (e.g., to zero).

In some implementations, multiple priority surfaces 225 are computed for particular groupings. As one example, a respective priority surface 225 can be computed for each carrier of a multi-carrier communication system 250. As another example, a respective priority surface 225 can be computed for each class of on-board media store 135 in a fleet of transport craft 110 (e.g., where different on-board media stores 135 have different storage capacity, serve different types of passengers, etc.). As another example, a respective priority surface 225 can be computed for each of multiple sub-fleets of transport craft 110 (e.g., where intercontinental aircraft provide different on-board media content than other aircraft), etc. Alternatively, implementations can handle some or all of those different cases using a single computed priority surface 225. For example, different classes of on-board media stores 135, different sub-fleets of transport craft 110, etc. can be part of the multidimensional priority data stored in the priority data store 227 and used to compute a single priority surface 225.

In other embodiments, groupings can be addressed by slicing and/or collapsing one or more priority surfaces 225 in one or more dimensions by the priority processor 220. For example, each illustrated priority surface 225 is a plot, for a selected time, of priority scores versus content file sets 207 versus craft media servers 130 (or on-board media stores 135); and slicing the priority surface 225 at a point along the axis corresponding to a particular craft media server 130 can yield a two-dimensional plot of priority scores versus content file sets 207 for that particular craft media server 130 at the selected time. Multiple such slices can be aggregated to represent a grouping. For example, multiple slices can be obtained from the priority surface 225 to yield multiple two-dimensional plots of priority scores versus content file sets 207 for multiple related craft media servers 130 at the selected time (e.g., for all craft media servers 130 of a set of transport craft 110 determined, or predicted, to be serviced by a particular carrier at the selected time). The slices can be aggregated (collapsed) into a single slice for the grouping by aggregating (e.g., by adding, by averaging, by computing a weighted sum, etc.) the priority scores across all the slices for each content file set 207, which can yield a single two-dimensional plot of aggregated priority scores versus content file sets 207 for the entire grouping of craft media servers 130 at the selected time. One or more of these groupings can be used for determining delivery files 230 (as described below) and/or for computing additional priority surfaces 225. For example, an additional priority surface 225 can be computed to represent priority scores for the selected time over at least at least some of the content file sets 207 over multiple groupings of craft media servers 130.

Grouping content file sets 207 at a particular time may result in a particular content file set 207 being associated with one priority score when considered not as part of the grouping, and with a different priority score when considered as part of the grouping. The different in priority score can, in some cases, cause a particular content file set 207 to satisfy one or more priority thresholds (described below) only when treated as part of a grouping. For example, a particular content file set 207 may have a relatively low priority when considered for delivery to each individual transport craft 110. However, when those transport craft 110 are all being serviced by a same carrier at a particular time, aggregation of priority scores to reflects the opportunity to multicast the particular content file set 207 to all those transport craft 110 at one time (i.e., by grouping across those transport craft 110) may yield an aggregated priority score associated with a relatively high priority.

As described above, the communications network 250 has a limited amount of available capacity, which fluctuates over time; and the release-time driven prioritization of content file set 207 delivery described herein can drive determinations of which files to deliver at which times. Embodiments of the priority processor 220 further include a delivery interface 229 to output a set of delivery files 230 (e.g., a stream of delivery file data). The delivery files 230 can be selected as a function of the priority surface 225 as those content file sets 207 (e.g., or, in some implementations, particular files of content file sets 207) for which the priority scores for the selected time satisfy one or more priority thresholds. As one example, the delivery files 230 can be selected as those content file sets 207 for which the priority scores for the selected time are above a particular priority threshold. As another example, the delivery files 230 can be selected as those content file sets 207 for which the priority scores for the selected time are at or above a particular priority threshold. As another example, the delivery files 230 can be selected as those content file sets 207 for which the priority scores for the selected time satisfy all of multiple priority thresholds. As another example, the delivery files 230 can be selected as those content file sets 207 for which the priority scores for the selected time fall between two priority thresholds. In some embodiments, the priority thresholds are defined statically. For example, the priority surface 225 can be computed so that all priority levels fall within a range from 0 to 100, and the priority threshold can be set to 85. In such an example, any point on the priority surface 225 having a priority level exceeding 85 can represent a content file set 207 having a priority level above 85 for the selected time with respect to a particular craft media server 130. In other embodiments, one or more priority thresholds can be defined dynamically. For example, the priority threshold can move up or down based on present available capacity of one or more carries of the communications network 250.

Figure 4:
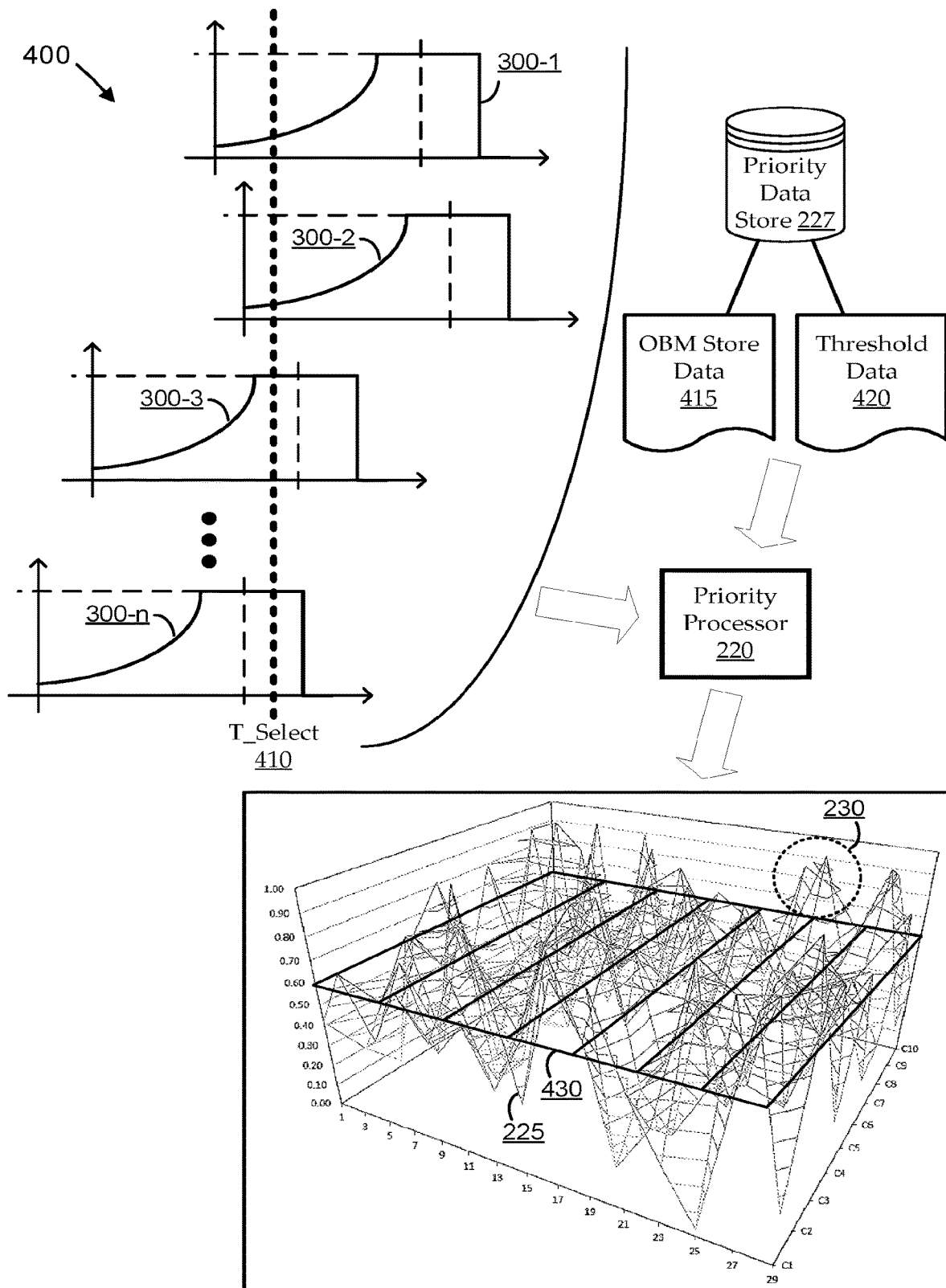
FIG. 4 shows an illustrative data flow representing computation of priority surfaces and delivery files.

As an example, FIG. 4 shows an illustrative data flow 400 representing computation of priority surfaces 225 and delivery files 230. As illustrated, a number of profile plots 300 (300-1 to 300-n) representing RTD priority profiles 217 can be obtained (e.g., each profile plot 300 being for an associated content file set 207), and each can indicate a different priority at a particular selected time 410. This different priority at the particular selected time 410 can be due to different shapes of the profile plots and/or different defined release times 310. For example, at the selected time 410, some content file sets 207 may have high associate delivery priorities (e.g., because the selected time is at or near their respective release time), while other content file sets 207 may have relatively low associated delivery priorities (because the selected time is further from their respective release time). Other priority data can also be obtained (e.g., from the priority data store 227), such as OBM store data 415 (e.g., data identifying some or all of the on-board media stores 135 in the fleet, which content file sets 207 are already stored in which of the on-board media stores 135, etc.) and/or threshold data 420 (e.g., defining one or more priority thresholds).

The priority processor 220 can use the priority and profile data to compute one or more priority surfaces 225. The illustrated priority surface 225 plots priority level for each file of each content file set 207 over each on-board media store 135 of a fleet of transport craft 110 with respect to the selected time 410. Some embodiments can use the threshold data 420 to compute an intersection surface 430 to intersect the priority surface 225 at a particular priority level. In some embodiments, as illustrated, the priority surface 225 is a three-dimensional surface, and the intersection surface 430 is a two-dimensional plane defined by setting the priority level to a constant value. In other embodiments, the priority surface 225 can be any suitable n-dimensional surface, and the intersection surface 430 can be any (n−1)-dimensional surface (e.g., or lower-dimensional, where appropriate). In the illustrated implementation, points on the priority surface 225 lying above the intersection surface 430 are classified as delivery files 230 (a small subset of the delivery files 230 is indicated by a dashed circle).

Turning back to FIG. 2, embodiments of the traffic shaper 240 are coupled with the priority processor 220 and can include the communications network interface 255 described above. Embodiments of the traffic shaper 240 can schedule delivery of the delivery files 230 over the communications network 250 to craft media servers 130 according to the priority surfaces 225 at the selected time 410. As described herein, prioritization of content file sets 207 (including those corresponding to RTP media objects) can be relative to priorities of other types of traffic that are, or may be, consuming network resources, such as (e.g., other traffic 259 illustrated as being included in the forward-link traffic streams 257. Accordingly, the traffic shaper 240 can schedule delivery of the delivery files 230 along with scheduling delivery of other portions of forward-link traffic streams 257 over the communications network 250. Some embodiments schedule the delivery as a function of network capacity associated with the selected time 410. For example, embodiments of the traffic shaper 240 include a capacity monitor 245 and/or a capacity predictor 247. The capacity monitor 245 can monitor present available capacity of one or more carriers of the communications network 250 in any suitable manner. In some implementations the traffic shaper 240 includes a network monitoring interface (not shown) to couple with the communications network 250 by which to receive network capacity information by the capacity monitor 245. The capacity predictor 247 can use information from the capacity monitor 245 and/or any other suitable information to predict (e.g., estimate) available capacity of one or more carriers of the communications network 250 at a particular future time. As described above, some embodiments can feed capacity information back to the priority processor 220, and the priority processor 220 can use the capacity data to adjust threshold information. For example, fed back capacity information can be stored in the priority data store 227 and used to dynamically shift the priority threshold(s) according to present or predicted network capacity associated with the selected time 410.

Some embodiments of the traffic shaper 240 further include a path predictor 247, which can obtain and/or generate information relating to transit paths of transport craft 110. Transit paths can be determined by the path predictor 247 in any suitable manner, such as by obtaining flight plan data for aircraft, monitoring and extrapolating current transit paths, etc. As described above, some embodiments seek to update on-board media stores 135 of craft media servers 130 only while the transport craft 110 are in transit. Some such embodiments use data generated by the path predictor 247 to determine which transport craft 110 are, or will be, in transit at the selected time 410. For example, some implementations can feed the path data generated by the path predictor 247 back to the priority processor 220, and the priority processor 220 can compute the priority surface 225 to account only for those of the on-board media stores 135 disposed on transport craft 110 in transit at the selected time. Other embodiments seek to optimize delivery efficiency for content file sets 207 by exploiting times in which multiple transport craft 110 are predicted to be in a same carrier of the communications system 250 at a same time. For example, data generated by the path predictor 247 can be used to determine predicted transit paths for many transport craft 110 and to determine when and where those transit paths are predicted substantially to overlap in time and space. The path data can be fed back to the priority processor 220, and the priority processor 220 can use the fed back data to compute the priority surface 225. In one such embodiment, the priority surface 225 is computed only for a selected subset of transport craft 110 predicted to be sharing carriers with other transport craft 110 at the selected time 410. In another such embodiment, the fed back data is used to weight priority data in the computation of the priority surfaces 225. This can effectively increase the priority levels reflected in the priority surfaces 225 for those of the content file sets 207 for which there is an opportunity to multicast to multiple transport craft at the same time. For example, a particular file that may not have been selected as a delivery file 230 (e.g., that otherwise would have had a priority level below the priority threshold at the selected time 410 for any particular on-board media store 135) may be re-weighted to become a delivery file 230 by accounting for its aggregated priority over groups of transport crafts 110 sharing carriers at the selected time 410.

Embodiments of the traffic shaper 240 can include any suitable components for shaping link packets of forward-link traffic streams 257 (e.g., to be transmitted to a satellite as a forward-link uplink signal) for communication over one or more carriers of the communications network 250. The forward-link traffic streams 257 can include any traffic being communicated to the transport craft 110 over the communications network 250, such as content file sets 207 corresponding to RTP media objects and any other network traffic 259. The traffic shaper 240 can include a congestion manager, or the like, to provide traffic shaping information based on a queue status of (e.g., amount of data queued in each of multiple priority queues 252, as described below), present network conditions (e.g., according to data obtained from the capacity monitor 245 and/or capacity predictor 247), and/or other suitable data. Embodiments of the traffic shaper 240 can schedule delivery of forward-link traffic streams 257 over carriers of the communications network 250 in any suitable manner. Some embodiments prioritize different portions (e.g., individual packets, service flows, streams, files, etc.) of the forward-link traffic streams 257 into one or more transmission queues 252, according to the delivery files 230 output from the priority processor 220. The queues 252 can be implemented in any suitable manner, for example, as first-in-first-out queues, data stacks, buffers, services flows, etc. For example, multiple priority thresholds can be assigned to different queues 252. In some embodiments, the priority queues 252 can be used along with one or more intersection surfaces 430. Embodiments described above (e.g., depicted as priority surface 225 and the representation of delivery files 230 in FIG. 2, or as the priority surface 225 and the intersection surface 430 in FIG. 4) show only a single intersection surface 430 corresponding to a single priority threshold. However, some implementations use multiple intersection surfaces 430 corresponding to multiple priority thresholds. Each of the multiple intersection surface 430 can be static or dynamic, as described above.

As an example, a first intersection surface 430 can correspond to a first priority threshold above which priority levels are sufficiently high to warrant high-priority delivery; and a second intersection surface 430 can correspond to a second priority threshold above which priority levels warrant normal-priority delivery (i.e., for priority levels above the second threshold and below the first threshold), and below which warrant only a low delivery priority (e.g., by opportunistically using network resources only when excess capacity is available). Those content file sets 207 warranting high-priority delivery, normal-priority delivery, and low-priority delivery can be assigned to a first priority queue 252a, a second priority queue 252b, and a third priority queue 252c, respectively; and the traffic shaper 240 can schedule delivery of portions of the forward-link traffic streams 257 in those priority queues 252 according to their respective priorities. Data packets in the first priority queue 252a can be scheduled to take precedence over other scheduled data packets in the communications network 250, can be formatted according to a highly robust modulation and/or encoding scheme, can be sent according to a reliable transport protocol, etc. Data packets in the second priority queue 252b can be scheduled along with other data packets in the communications network 250, can be formatted according to a less robust (e.g., and lower overhead) modulation and/or encoding scheme, can be sent according to a best-effort transport protocol, etc. Data packets in the third priority queue 252b can be scheduled only to be delivered in the event of excess available (e.g., presently unscheduled and/or unallocated) capacity on the communications network 250, can be formatted according to non-robust modulation and/or encoding scheme, can be sent according to unreliable transport protocols, etc.

Figure 5:
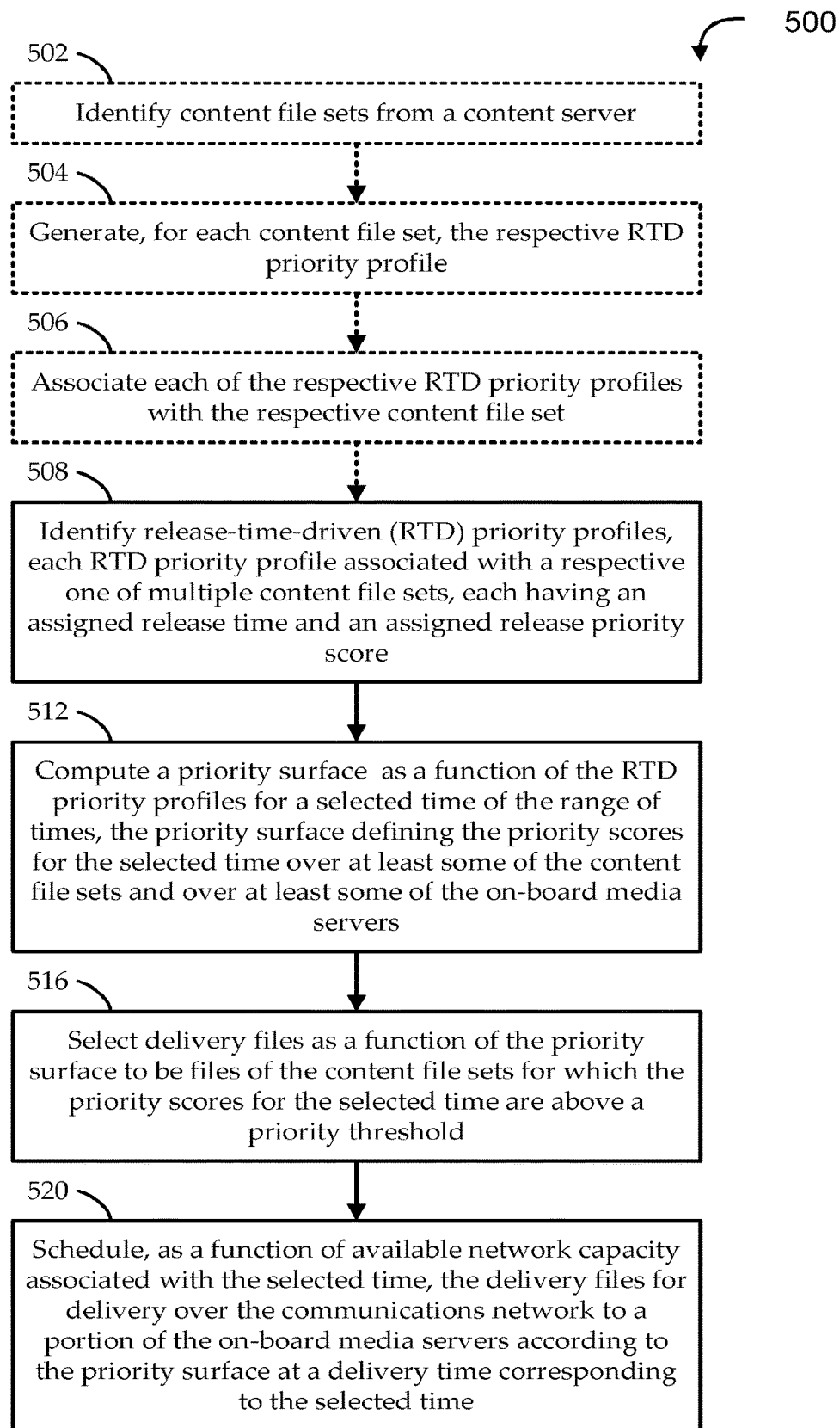
FIG. 5 shows a flow diagram of an illustrative method for release-time driven prioritization of on-board content to on-board media servers disposed on a plurality of transport craft via a communications network, according to various embodiments.

FIG. 5 shows a flow diagram of an illustrative method 500 for release-time driven prioritization of on-board content to on-board media servers disposed on a plurality of transport craft via a communications network, according to various embodiments. Embodiments of the method 500 begin at stage 508 by identifying release-time-driven (RTD) priority profiles (e.g., by the content processor 210). Each RTD priority profile is associated with a respective one of multiple content file sets, and each of the content file sets can have an assigned release time and an assigned release priority score. Each RTD priority profile can define priority scores over a range of times for delivery of the respective content file set via the communications system. The range of times can include a first time window during which the respective priority scores are less than the assigned release priority score of the respective content file set, and a second time window succeeding the first time window and comprising the assigned release time of the respective content file set. The respective priority scores are equal to (i.e., substantially at the same level as) the assigned release priority score during at least a portion of the second time window (e.g., for the entirety of the second time window, at one point in the second time window, etc.). The assigned release priority score can be different for different ones of the content file sets. In some cases, the range of times can include a third time window subsequent to the second time window, during which the respective priority scores are again less than the assigned release priority score of the respective content file set. In some implementations, the range of times has no definite end time. For example, the third time window can have no defined end.

In some embodiments, the method begins prior to the identifying in stage 508. For example, some embodiments can begin at stage 502 by identifying the content file sets from a content server. At stage 504, for each of the content file sets, the respective RTD priority profile can be generated (e.g., by the content processor 210). Each of the respective RTD priority profiles can be associated with its respective content file set at stage 506 (e.g., by the content processor 210). After the associating in stage 506, such embodiments can proceed with the identifying in stage 508.

At stage 512, embodiments can compute a priority surface as a function of the RTD priority profiles identified in stage 508 for a selected time of the range of times. The priority surface can define the priority scores for the selected time over at least some of the content file sets and over at least some of the on-board media servers.

At stage 516, embodiments can select delivery files as a function of the priority surface. The selected delivery files can be those files of the content file sets (e.g., entire content file sets, or portions thereof) for which the priority scores for the selected time are above a priority threshold. Some embodiments can determine the available network capacity for the communications network associated with the selected time. In such embodiments, the priority threshold can be computed as a function of the network capacity availability, such that the plurality of delivery files is sized substantially to fill the network capacity availability. Some embodiments can select multiple sets of delivery files based on one or more thresholds. For example, a first set of delivery files can include those with priority levels above a particular threshold, and a second set of delivery files can include those with priority levels below the particular threshold. As another example, three sets of delivery files can correspond to those with priority levels above a first threshold, between the first and a second threshold, and below the second threshold, respectively.

At stage 520, embodiments can schedule, as a function of available network capacity associated with the selected time, the delivery files for delivery over the communications network to a portion of the on-board media servers according to the priority surface. The scheduling can be for delivery at the selected time. In some embodiments, the scheduling in stage 520 includes selecting the portion of the on-board media servers, such that each selected one of the on-board media servers is disposed on a transport craft that is in transit at the selected time. In some embodiments where multiple sets of delivery files are selected in stage 516 (e.g., based on one or more thresholds), the scheduling at stage 520 can include assigning different sets of delivery files to different priority queues. For example, the priority queues can be assigned by the network for high-priority delivery, normal-priority delivery, low-priority delivery, etc.

In some embodiments, the communications network is a multi-carrier communications network, such that transport craft move over time between the various carriers. In such embodiments, the scheduling at stage 520 can include determining, at the selected time for a carrier of the multi-carrier communications network, that a set of the on-board media servers is associated with the carrier (e.g., currently being and/or predicted to be serviced by the carrier at the selected time). A portion of the delivery files can be identified as associated with delivery to the set of the on-board media servers according to the priority surface, and the portion of the delivery files can be scheduled for delivery over the carrier to the set of the on-board media servers at the selected time. Some such embodiments determine that the set of on-board media servers is and/or predicted to be concurrently serviced by the carrier at the selected time and schedule the portion of the delivery files for multicasting over the carrier to the of set on-board media servers at the selected time. For example, embodiments can determine a predicted transit path for each of the on-board media servers, and can predict that the set of on-board media servers is to be concurrently serviced by the carrier at the selected time according to the predicted transit paths. In some cases, the priority surface can be re-computed to account for the set of the on-board media servers being concurrently serviced by the carrier at the selected time.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a tangible computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A method for delivery of content to a transport craft within a communications system, comprising:
    identifying a plurality of media objects, each of the plurality of media objects having an associated priority profile comprising a time-varying priority score over at least one time window, the time-varying priority score related to release of a media object to the transport craft;
    determining a priority score for the release of the media object for each of the plurality of media objects for a given time point based on the associated priority profile of each of the plurality of media objects;
    selecting one or more media objects from the plurality of media objects based on the priority scores at the given time point and an available capacity of the communications system; and
    scheduling the one or more media objects for transmission to the transport craft.

2. The method of claim 1, wherein the scheduling the one or more media objects for transmission comprises scheduling the one or more media objects for multicasting to a plurality of transport craft.

3. The method of claim 1, wherein the priority profiles are used to generate a priority surface of the time-varying priority score over a multidimensional space for the given time point.

4. The method of claim 3, wherein one dimension of the multidimensional space comprises a set of craft media servers for a corresponding set of transport crafts.

5. The method of claim 1, wherein the selecting comprises selecting the one or more media objects having highest priority scores to substantially fill the available capacity of the communications system.

6. The method of claim 1, wherein the associated priority profile for each of the plurality of media objects comprises a release priority score and a release time.

7. The method of claim 6, wherein the priority score for at least one of the plurality of media objects in the at least one time window prior to the release time is less than the release priority score.

8. The method of claim 6, wherein the given time point is prior to the release time for at least one of the plurality of media objects.

9. The method of claim 1, wherein the selecting the one or more media objects comprises comparing respective priority scores for the plurality of media objects for the given time point to a priority threshold, wherein the priority threshold is dynamically determined based on the available capacity of the communications system.

10. The method of claim 1, wherein at least one of the plurality of media objects comprises a content file set having a plurality of files.

11. The method of claim 1, further comprising:
transmitting the one or more media objects for transmission to the transport craft while the transport craft is in transport.

12. A system for delivery of content to a transport craft, comprising:
a content processor operative to identify a plurality of media objects, each of the plurality of media objects having an associated priority profile comprising a time-varying priority score over at least one time window, the time-varying priority score related to release of a media object to the transport craft; and
a priority processor operative to:
determine a priority score for the release of the media object for each of the plurality of media objects for a given time point based on the associated priority profile of each of the plurality of media objects, and
select one or more media objects from the plurality of media objects based on the priority scores at the given time point and an available capacity of a communications network, and
schedule the one or more media objects for transmission to the transport craft.

13. The system of claim 12, wherein the priority processor is further operative to schedule the one or more media objects for multicasting to a plurality of transport craft.

14. The system of claim 12, wherein the priority processor utilizes the priority profiles to generate a priority surface of the time-varying priority score over a multidimensional space for the given time point.

15. The system of claim 14, wherein one dimension of the multidimensional space comprises a set of craft media servers for a corresponding set of transport crafts.

16. The system of claim 12, wherein the priority processor selects the one or more media objects having highest priority scores to substantially fill the available capacity of the communications network.

17. The system of claim 12, wherein the associated priority profile for each of the plurality of media objects comprises a release priority score and a release time.

18. The system of claim 17, wherein the priority score for at least one of the plurality of media objects in the at least one time window prior to the release time is less than the release priority score.

19. The system of claim 17, wherein the given time point is prior to the release time for at least one of the plurality of media objects.

20. The system of claim 12, wherein the priority processor selects the one or more media objects by comparing respective priority scores for the plurality of media objects for the given time point to a priority threshold, wherein the priority threshold is dynamically determined based on the available capacity of the communications network.

21. The system of claim 12, wherein at least one of the plurality of media objects comprises a content file set having a plurality of files.

22. The system of claim 12, further comprising:
a communication network interface operative to transmit the one or more media objects to the transport craft while the transport craft is in transport.

* * * * *